United States Patent [19]

Roberts et al.

[11] 3,803,082

[45] Apr. 9, 1974

[54] STABILIZATION OF LIGHT METAL HYDRIDE (U)

[75] Inventors: Charles B. Roberts, Midland; Darell D. Toner, Sanford, both of Mich.

[73] Assignee: The Dow Chemical Company, Midland, Mich.

[22] Filed: Dec. 28, 1967

[21] Appl. No.: 694,785

[52] U.S. Cl.............. 260/448 R, 149/109, 423/644, 423/645, 260/448.2
[51] Int. Cl. ............................................. C07f 5/06
[58] Field of Search...... 23/204, 365, 366; 260/448, 260/448.2; 423/644, 645; 149/109

[56] References Cited
UNITED STATES PATENTS
3,184,418   5/1965   Woods et al................... 260/448 X

*Primary Examiner*—Carl D. Quarforth
*Assistant Examiner*—F. M. Gittes
*Attorney, Agent, or Firm*—L. S. Jowanovitz

[57] ABSTRACT

This invention is concerned with the stabilization of light metal hydrides and more particularly is concerned with a novel process for improving the thermostability of substantially non-solvated crystalline aluminum hydride and to the resulting stabilized composition. The invention is carried out by treating the reaction mixture employed in the initial preparation of a light metal hydride with an alkyl or aryl substituted silicol.

6 Claims, No Drawings

STABILIZATION OF LIGHT METAL HYDRIDE (U)

BACKGROUND OF THE INVENTION

Light metal hydrides, e.g., substantially non-solvated, crystalline aluminum hydride, find utility as fuel components in solid rocket propulsion systems, as gas generators and in other similar operations. In particular, a substantially non-solvated, ether insoluble, crystalline aluminum hydride (hereinafter referred to as alpha-aluminum hydride) having a hexagonal crystal structure, a specific well-defined X-ray diffraction pattern and a density of over 1.4 grams per cubic centimeter has been found to be an especially desirable fuel for solid rocket propulsion systems. This compound has been disclosed in application Ser. No. 179,509 by Norman E. Matzek and Donald F. Musinski. However, at temperatures above about 60°C. this material both during storage and when used in a propellant grain tends to undergo detrimental spontaneous decomposition with time liberating gaseous hydrogen.

Some increase in the thermostability of this and other non-solvated aluminum hydride materials has been realized by coating the surface of these compounds with either an inert coating or with materials which react with aluminum hydride to give a relatively inert surface layer.

Now, unexpectedly it has been found by the practice of the present invention that thermostabilization of such aluminum hydride materials to a much greater magnitude can be attained by incorporating small quantities of an alkyl or aryl substituted silicol, i.e., a silicoalkyl- or silicoaryl alcohol, into the product. For convenience, these materials hereinafter sometimes will be referred to by the general terms "silicols" or "silicol." Additionally, the present invention provides a stabilized light metal hydride product, the improved degree of thermostability of which is consistent and reproducible from product to product.

SUMMARY

In accordance with the present invention, small amounts of an alkyl or aryl substituted silicol corresponding to the formula $R_3SiOH$, where R is either H, $-CH_3$, $-C_2H_5$ or $-C_6H_5$ and further characterized in that at least one of the R group substituents must be one of the hereinbefore listed organic groups, is incorporated into the lattice of the aluminum hydride in an amount to provide in the substantially non-solvated, crystalline aluminum hydride product a molar ratio of silicol/aluminum hydride of from about 0.2 to about 0.001. Ordinarily the invention is carried out to provide a silicol/aluminum hydride mole ratio of from about 0.1 to about 0.005.

Usually in carrying out the present process, a predetermined quantity of a silicol is added directly to a reaction mixture during the preparation of the aluminum hydride. This assures that the silicon values are quite uniformly dispersed throughout the lattice in the resulting stabilized product.

DESCRIPTION OF PREFERRED EMBODIMENT

In a preferred embodiment, trimethylsilicol [$(CH_3)_3SiOH$], which is miscible with ether, is introduced into and mixed with agitation in a reaction mixture of a halide source material, e.g., aluminum chloride or a chloroalkylsilane, e.g., dichlorodimethylsilane [$(CH_3)_2SiCl_2$], and alkali metal aluminum hydride, e.g., $LiAlH_4$ or $NaAlH_4$, in ether, e.g., diethyl ether, used to prepare aluminum hydride. Ordinarily the lithium aluminum hydride-chloride source material reactants employed range in a gram mole ratio of 2 to 4 based on that required stoichiometrically for aluminum hydride formation. With $AlCl_3$, a molar ratio of from 3 to 4 ($LiAlH_4/AlCl_3$) ordinarily is used while a molar ratio of about 2 ordinarily is used with $(CH_3)_2SiCl_2/LiAlH_4$ mixtures. Following the reaction period, ether is removed from the product mixture by heating at a temperature of from about 40° to about 140°C. ordinarily in the presence of a complex borohydride such as lithium borohydride, sodium borohydride or excess of the alkali metal aluminum hydride, thereby to provide a crystalline, substantially non-solvated aluminum hydride containing a predetermined amount of the silicol additive. Generally, the amount of complex hydride used is such that there is from about one-fourth to about 1 mole of the complex hydride present for each mole of aluminum hydride product.

Substantially non-solvated large-sized, particulate, crystalline alpha aluminum hydride particles ranging from about 10 to about 50 microns or larger form directly in the reaction solution if the temperature is maintained at from about 50° to about 85°C. and preferably at from about 60° to about 80°C., and most desirably at about 75°–77°C. This result is unexpected in view of the fact that the product obtained from the same solutions at lower temperatures is substantially completely solvated and of undesirably small sized, e.g., sub-micron particles.

In carrying out this process with low boiling ether solvents the desired crystallization temperatures are obtained by controllably increasing the pressure on the solution while heating thereby to raise the effective boiling point of the solution and give a predetermined reaction temperature. Alternatively, and preferably, an ether solution of aluminum hydride is introduced into an inert organic liquid having a higher boiling point than the ether, and preferably above about 80°C., to provide a solution having a normal boiling point of at least 50°C. This eliminates the need for use of superatmospheric pressure. Liquid hydrocarbons, preferably having a boiling point of above 80°C., such as for example, benzene, toluene, biphenyl, xylene, biphenyl benzene, decane and the like have been found to be particularly suitable.

Alternatively, the silicol can be added to an aluminum hydride feed solution or slurry employing as a solvent or carrier a mixture of an ether and an organic liquid miscible with said ether and having a boiling point higher than that of the ether or the organic liquid itself. In such systems the aluminum hydride concentration in the feed material usually ranges from about 0.005 to about 3 molar. The resulting silicol containing aluminum hydride feed mixture at a temperature of from the freezing point up to the boiling point of the liquid phase is introduced into a crystallizer containing a quantity of the higher boiling liquid. Ordinarily, the crystallizer contains a mixture of ether and the higher boiling liquid of a predetermined concentration to provide a final equilibrium crystallizing liquid composition having a maximum of about 10 volume per cent ether. This is maintained at about reflux under total condensing conditions. Macrocrystalline, hexagonal, substantially non-solvated alpha aluminum hydride particles having silicon values incorporated in the crystal lattice crystallize and grow therein. These are removed from the crystallizer, the residual solvent liquid which is at equilibrium with respect to dissolved aluminum hydride ordinarily being recycled for use in preparing additional aluminum hydride feed.

Usually, the aluminum hydride feed material is prepared directy for use in the present process by reacting lithium aluminum hydride and aluminum chloride or dichlorodimethylsilane in the presence of a silicol in a recirculated alpha aluminum hydride depleted ether-higher boiling liquid solvent mixture. Alternatively, a silicol can be introduced into a solution of an aluminum hydride prepared by other processes for use in the practice of the present invention.

In the actual practice of the present invention, trimethyl silicol [$(CH_3)_3SiOH$] ordinarily is added in predetermined quantities, based on the theoretical aluminum hydride product yield to an agitated ethereal reaction mixture of lithium aluminum hydride and chloride source material as set forth hereinbefore. The resultant mix is stirred or otherwise agitated for a period of at least about 3 minutes, ordinarily from about 5 minutes to about 1.5 hours or more and usually from about 10 minutes to about 1 hour. The substantially non-ether solvated, crystalline aluminum hydride product having silicon values in the structure is prepared from this reaction mixture by ether removal or at reflux of an equilibrium ether-higher boiling organic liquid solvent following the practices described hereinbefore.

As is the usual practice in such preparations, for optimum yield and for high product purity, all manipulative and operating steps and material handling and storage procedures are to be carried out in an inert, substantially anhydrous atmosphere, e.g., nitrogen, argon and the like. Also, all reactants, solvents and carriers should be substantially moisture-free.

The process proceeds readily at atmospheric pressure although both superatmospheric and subatmospheric pressures can be employed, if desired.

The products resulting from the present process consistently and reproducibly show a higher degree of thermostability than has been realized heretofore with untreated or surface coated light metal hydrides. However, it is to be understood that, if desired, the stabilized products of the present invention can be given a surface treatment to still further increase their stability as there is no detrimental reaction between the silicon containing stabilized light metal hydride and the protective coatings ordinarily used to stabilize the light metal hydrides themselves.

Although we do not intend to limit ourselves to any particular theory or mechanism to explain the unexpectedly increased normal stability of the product of the present invention, one proposed explanation is that the silicol reacts with aluminum hydride to provide a product which is soluble in the solvents employed and thus is available and readily incorporated into the crystal lattice of the non-solvated aluminum hydride.

The reaction of aluminum hydride with trimethylsilicol is presented to show one illustrative embodiment of the silicon containing stabilizing additive.

$$AlH_3 + (CH_3)_3SiOH \rightarrow H_2AlOSi(CH_3)_3 + H_2$$

The following Example will serve to further illustrate the present invention but is not meant to limit it thereto.

EXAMPLE

1a. A solution of aluminum hydride was prepared by mixing at room temperature about 30 millimoles of dichlorodimethylsilane $(CH_3)_2SiCl_2$ with about 75 millimoles of lithium aluminum hydride ($LiAlH_4$) in about 70 milliliters diethyl ether. The resulting mixture was filtered through a medium glass frit to remove precipitated lithium chloride therefrom. About 15 millimoles of lithium borohydride ($LiBH_4$) was added to the product solution along with about 0.3 millimole trimethylsilicol dissolved in 10 milliliters of diethyl ether. Additionally, about 300 milliliters of benzene was added to the mixture. This reaction mass on a theoretical basis was indicated to contain about 0.3 millimole of the silicol and to provide about 60 millimoles of $AlH_3$ product; i.e., to have a $(CH_3)_3SiOH/AlH_3$ molar ratio of about 0.005.

The resulting mixture was stirred for about 20 minutes, filtered into a reaction flask and the flask connected to a distillation column. The product solution in the flask was heated under total reflux for one hour at atmospheric pressure, the reflux temperature being about 76°–77°C. At 75.2°C. white crystalline product started forming in the reactor. Crystal growth continued over the heating period. Following the reflux operation, the reaction vessel containing the white crystalline product was removed from the distillation column and the product washed with diethyl ether. The solid product was dried at ambient temperature, i.e., ~18°–20°C., under a reduced pressure of about $1 \times 10^{-3}$ millimeter mercury absolute.

All manipulative and operating procedures were carried out in the presence of a substantially anhydrous nitrogen atmosphere and all reactants, solvents and liquid carriers were substantially moisture-free.

As a control, this procedure was repeated except the silicol addition was not made to the reaction mass.

The resulting product in both cases as determined from X-ray diffraction analysis was hexagonal, crystalline, substantially non-solvated aluminum hydride (i.e., alpha aluminum hydride).

The thermostability of the silicon containing aluminum hydride and the regular alpha aluminum hydride product were evaluated. For this study the samples were placed in a modified Taliani manometric assembly and heated at 60°C. under nitrogen at one atmosphere pressure. The pressure rise of the system was noted over a period of time and from the pressure measurements the percentage decomposition determined.

The results of this study are summarized in Table I.

TABLE I

| Time on Test at 60°C. (days) | Total Decomposition — % | |
|---|---|---|
| | Untreated Alpha Aluminum Hydride | Silicon Containing Aluminum Hydride |
| 1 | 0.1 | 0.04 |
| 2 | 0.25 | 0.04 |
| 3 | 0.50 | 0.05 |
| 4 | 1.0* | 0.08 |
| 5 | >2 | 0.16 |
| 6 | | 0.40 |
| 7 | | 0.70 |
| 8 | | 1.04 |
| 9 | | 1.46 |
| 10 | | 1.76 |

*Rapid, pronounced decomposition noted.

1b. The above described preparation was repeated using the same quantities of reactants but following a slightly modified procedure. In this preparation, about 60 millimoles of lithium aluminum hydride was added at room temperature to 70 milliliters of diethyl ether and about 30 millimoles of dichlorodimethyl-silane added slowly to the resulting solution. This mixture is that required stoichiometrically for preparation of aluminum hydride. This mixture was stirred for several minutes and filtered into a 500 milliliter flask. Thirty microliters of trimethylsilicol (~ 0.3 millimoles) in 5 milliliters of diethyl ether was added to the solution and the resulting mixture stirred for about one minute. The remaining lithium aluminum hydride, ~ 15 millimoles, along with 15 millimoles of $LiBH_4$ and 300 milliliters of benzene were added to the solution and the resulting reaction mass stirred at room temperature for 5 minutes and then filtered. The filtrate was heated under total reflux for 1 hour, product crystallization beginning when the temperature reached about 76.5°C.

The resulting crystalline product was recovered, dried and subjected to X-ray product diffraction analysis using the same procedures described for the preceding run. The X-ray analysis showed the product to be alpha aluminum hydride.

The thermostability was determined using the Taliani test described above. The results of this study are summarized in Table II.

TABLE II

| Days on Test | Total Decomposition — % |
| --- | --- |
| 1 | 0.02 |
| 2 | 0.04 |
| 3 | 0.05 |
| 4 | 0.08 |
| 5 | 0.12 |
| 6 | 0.18 |
| 7 | 0.32 |
| 8 | 0.58 |
| 9 | 0.96 |
| 10 | 1.44 |

1c. In a similar preparation employing reactants in quantities and following the procedure set forth for the run 1b but using trimethylsilicol in an amount to provide a $(CH_3)_3SiOH/AlH_3$ molar ratio of about 0.025, silicon containing alpha aluminum hydride was prepared.

1d. In another run, about 5 millimoles of trimethylsilicol (i.e., to provide a $(CH_3)_3SiOH/AlH_3$ molar ratio of ~0.08,) was incorporated into alpha aluminum hydride again using reactant quantities and procedure as set forth in run 1b. This provided a crystalline product shown by X-ray powder diffraction to be substantially all alpha aluminum hydride.

1e. The preparation of silicon containing alpha aluminum hydride was carried out following the procedure of run 1b but using about 150 millimoles $LiAlH_4$, 60 millimoles $(CH_3)_2SiCl_2$, 30 millimoles $LiBH_4$, 70 milliliters of diethyl ether and 700 milliliters of benzene. Sufficient $(CH_3)_3SiOH$ was added to the reaction mixture to provide a $(CH_3)_3SiOH/AlH_3$ molar ratio of ~ 0.04. The resulting white crystalline product was shown to be substantially all alpha aluminum hydride.

1f. The preparation of alpha aluminum hydride having silicon in the crystal lattice also was carried out using aluminum chloride instead of dichlorodimethyl-silane following the procedure set forth hereinbefore.

The products from these latter runs were found by the Taliani test to undergo less than 1 per cent decomposition over periods ranging from about 6.5 to about 9.1 days thus showing a marked increase in resistance to thermal degradation over that exhibited by ordinary alpha aluminum hydride.

Various modifications can be made in the present invention without departing from the spirit or scope thereof for it is understood that we limit ourselves only as defined in the appended claims.

We claim:

1. A crystalline, substantially non-ether solvated aluminum trihydride having silicon values associated therewith, said silicon values provided by a silicol corresponding to the formula $R_3SiOH$ where R is a member selected from the group consisting of H, $-CH_3$, $-C_2H_5$ and $-C_6H_5$ and further characterized in that at least one of the R substituents of said silicol is $-CH_3$, $-C_2H_5$ or $-C_6H_5$, the molar ratio of said silicol/aluminum trihydride ranging from 0.2 to 0.001, said aluminum trihydride exhibiting an increased thermostability over that exhibited by the same type of crystalline aluminum trihydride not having said silicon values associated therewith.

2. The aluminum trihydride as defined in claim 1 having a hexagonal crystal structure wherein the silicon values are provided by trimethylsilicol.

3. The hexagonal crystalline aluminum trihydride as defined in claim 2 wherein the trimethylsilicol/aluminum trihydride molar ratio ranges from about 0.1 to about 0.005.

4. A process for increasing the thermostability of a crystalline, substantially non-ether solvated aluminum trihydride which comprises;

a. providing an ethereal reaction mass of a halide containing member selected from the group consisting of dichloromethylsilane or aliminum chloride, and an alkali metal aluminum hydride, the mole ratio of said alkali metal aluminum hydride/halide containing member in the reaction mass ranging from about 2 to about 4, said ethereal mass also containing from about one-fourth to about 1 mole of a complex metal hydride selected from the group consisting of lithium borohydride, sodium borohydride or excess of the alkali metal aluminum hydride per mole of aluminum hydride product, b. adding a silicol to said reaction mixture, said silicol corresponding to the formula $R_3SiOH$ where R is a member selected from the group consisting of H, $-CH_3$, $-C_2H_5$ and $-C_6H_5$ and further characterized in that at least one of the R substituents of said silicol is $-CH_3$, $-C_2H_5$ or $-C_6H_5$, the quantity of said silicol being that required to provide a molar ratio of $R_3SiOH$/aluminum trihydride of from 0.2/0.001, c. agitating the resulting silicol containing aluminum trihydride reaction mixture for a period of at least about 3 minutes, and d. recovering a crystalline substantially non-ether solvated aluminum trihydride having silicon values associated therewith.

5. The process for preparing a substantially non-ether solvated, crystalline aluminum trihydride product having an improved thermostability as defined in claim 4 wherein;

the silicol is trimethylsilicol, said trimethylsilicol being present in an amount to provide a $(CH_3)_3SiOH/AlH_3$ molar ratio of from about 0.1 to about 0.005, the resulting mixture is agitated at about room temperature for a period of from about 5 minutes to about 1.5 hours, and the ether is removed while heating the resulting mixture in the presence of an aromatic liquid hydrocarbon soluble in said ether at a temperature of from about 45° to about 140°C. thereby precipitating a substantially non-ether solvated, crystalline aluminum trihydride product having silicon values associated therewith, and recovering said aluminum hydride product.

6. The process as defined in claim 5 wherein the mixture is heated at reflux in the presence of benzene at temperature of from about 60° to about 80° C., thereby to precipitate said substantially non-ether solvated, crystalline aluminum trihydride product having silicon values associated therewith.

* * * * *